United States Patent [19]

Vink

[11] 4,108,053
[45] Aug. 22, 1978

[54] VARIABLE BREW COFFEE MAKER

[75] Inventor: Richard C. Vink, Essex, Conn.

[73] Assignee: North American Philips Corporation, New York, N.Y.

[21] Appl. No.: 671,418

[22] Filed: Mar. 29, 1976

[51] Int. Cl.² ............................................ A47J 31/10
[52] U.S. Cl. ........................................ 99/306; 99/318
[58] Field of Search ................................. 99/279–294, 99/295, 299–307, 309, 310–311, 313, 316–317, 318

[56] References Cited

U.S. PATENT DOCUMENTS

| 1,665,199 | 4/1928 | Bachelder | 99/285 |
| 1,778,792 | 10/1930 | Cameron | 99/284 |
| 3,040,648 | 6/1962 | Vieceli | 99/305 |
| 3,153,377 | 10/1964 | Bosak | 99/280 |
| 3,460,459 | 8/1969 | Austin | 99/282 |
| 3,520,247 | 7/1970 | Hester | 99/305 X |

FOREIGN PATENT DOCUMENTS

738,678  7/1966  Canada ................................. 99/305

Primary Examiner—Harvey C. Hornsby
Assistant Examiner—Timothy F. Simone
Attorney, Agent, or Firm—Frank R. Trifari; Rolf E. Schneider

[57] ABSTRACT

An electric drip coffee maker having a brew control device for selectively varying the coffee strength between weak and strong, while independently varying the quantity of coffee brewed.

6 Claims, 12 Drawing Figures

VARIABLE BREW COFFEE MAKER

BACKGROUND OF THE INVENTION

This invention is in the field of electric drip coffee makers, and particularly the type were a quantity of ground coffee is placed in a brewing basket, and a quantity of water in a reservoir is heated and caused to flow through the ground coffee, whereby the coffee is brewed and then discharged into a receptacle. Typically, the brewing basket has spaced inlet apertures in the top for distributing the hot water relatively uniformly as it drips into the coffee grounds, and exit apertures in the bottom through which brewed coffee is discharged. Also, the brewing basket may include a by-pass tube, whereby excess heated water can by-pass the coffee grounds and flow directly into the receptacle, to reduce excessive water and resultant foaming in the brewing basket and to avoid excessive brewing time.

For the purpose of describing and comparing coffee brewed by different apparatus and different recipes, certain standards have been eestablished by the Coffee Brewing Center (CBC) of the Pan American Coffee Bureau, an independent organization promoting higher standards for coffee making. According to the CBC coffee strength is acceptable in the range of hydrometer readings of $1.15 \pm 5\%$ for weak coffee to $1.35 \pm 5\%$ for strong coffee, which allows an overall acceptable range of hydrometer readings from 1.09 to 1.42.

To consistently produce excellent coffee within these standards has been a considerable problem, as evidenced by consumers' exclamations of surprise and pleasure on the occasions when a coffee brew is truly successful. This problem is compounded when brewing a small amount of coffee, i.e. 2-3 cups, in any of the currently popular coffee-making devices having relatively large capacities, i.e. 10-20 cups. The proper brewing process according to CBC, requires six ounces of heated water to flow through each ten grams of coffee grounds, with a time period of approximately seven minutes elapsing for the water to traverse the bed of grounds. When one wishes to brew a small quantity, i.e. 10-15 grams of ground coffee in a large apparatus, there is the problem that this small quantity produces a shallow bed of grounds through which water flows quickly with insufficient brewing time; other shapes of brew baskets and beds of coffee therein produce other problems; for example a conical shape with a narrow bottom-end results in non-uniform distribution of water through the bed; another problem is the tendency of the water and grounds to foam, causing back-up of the water and flooding. To selectively vary the strength of the brew within the acceptable range of hydrometer readings and allowable brewing time, has been even more elusive a task with presently available apparatus.

It is an object of the present invention to provide a coffee maker capable of consistently brewing excellent-tasting coffee, while varying the quantity of the brew and varying the strength of the brew from weak to strong. Accordingly, this invention provides a complete coffee maker, and also a new brewing basket operable with known coffee making apparatus that produces hot water to be dripped through the basket.

SUMMARY OF THE INVENTION

The new coffee maker includes a reservoir for water that is to be heated, a receptacle for receiving brewed coffee, and a brew-control, coffee-brewing basket in which the coffee is actually brewed. The new brewing basket comprises two vertically positioned components, namely a master brew basket at the bottom for containing a quantity of ground coffee into which heated water is dripped, brewed, and then discharged to the receptacle below, and above the brewing basket, a spreader plate-spreader basket assembly for selectively proportioning the amount of water directed into the coffee grounds and the amount of water directed via an overflow duct which by-passes the coffee grounds, directly into the receptacle for diluting the brewed coffee therein.

In the spreader plate are two apertures through which the water flows; in the spreader basket is a collection space for water later directed to the coffee grounds, and a central column with two vertical chambers, the first for directing water from the spreader plate to the overflow duct, and the second for directing water from the spreader plate to the collection space. The top edges of these chambers are closely adjacent slots in the spreader plate, and function as baffles or seals in cooperation with the slots to control and direct the water flow.

In operation heated water is pumped and flows into the spreader plate and through the slots into the spreader basket. Rotation of the plate partially or fully aligns its slots with the two chambers in the spreader basket column. In one extreme position of rotation, most of the water from the spreader plate is directed to the second of said two chambers and thence to the coffee grounds, with a minimum of water directed to the overflow duct and a resultant brew of maximum strength. In the other extreme position most of the water from the spreader plate is directed to the first chamber and thence to the overflow duct, with a minimum of water conveyed to the grounds, and a resultant brew of minimum strength. Between these extreme positions are all the intermediate positions of rotation for various coffee strengths.

The amount of coffee brewed is varied by varying the quantity of ground coffee placed in the brewing basket and the quantity of heated water dripped through the coffee, while also varying the ratio of this water that by-passes this coffee. A non-linear relationship evolves regarding these ratios, of brewing water, overflow water, and brewing time for the water to drip because of many factors including: the bed of coffee grounds is initially dry and porous and quickly becomes wet and dense; the water and grounds tend to foam, back up and flood the overflow duct; the flow paths of the water through the grounds tend to vary and be non-uniform; and the coffee grounds vary in composition, mix, size, and reaction with the water. The new apparatus provides a solution via a simple structure that has been designed to be almost automatic for the user.

An optional feature of the present invention is an auxiliary overflow passage to accommodate excessive or unexpected foaming and thus prevent back-flow or flooding. This auxiliary passage is between the first and second chambers of the spreader basket which allows overflow to the by-pass duct, to begin earlier in the operation, and also allows a greater by-pass flow to occur at once.

A preferred embodiment of the new apparatus for variably controlling the brew strength, while simultaneously varying its quantity, is disclosed and described below in conjunction with the attached drawings.

DETAILED DESCRIPTION OF THE PREFERRED EMBODIMENT

Figure 1:
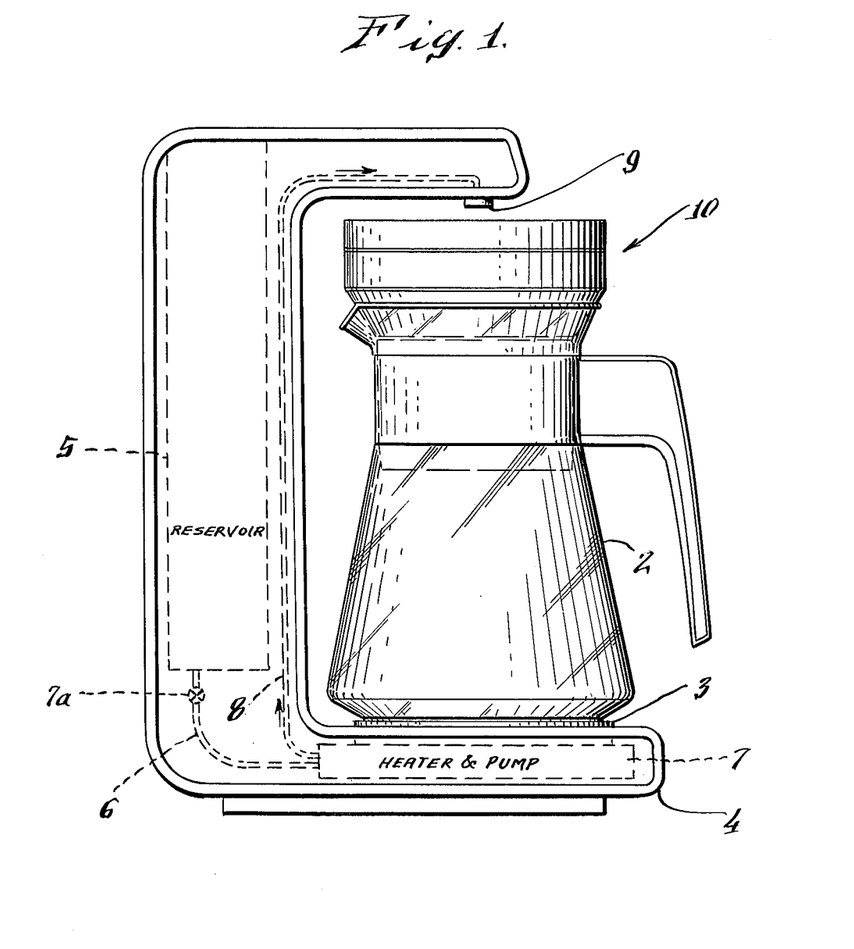
FIG. 1 is an elevation view of the new coffee maker.

The preferred embodiment of the invention is a coffee maker as shown in FIG. 1 having a brew control assembly for varying the strength of the coffee brew and also for varying the quantity of coffee brewed and finally for varying both simultaneously. More specifically with this apparatus one can brew from three to twelve cups of coffee, and vary the brew strength from light to medium to dark. This new coffee making apparatus includes a receptacle 2, seated upon the top surface of a heater 3 in the base 4. Cold water received in the reservoir 5 flows down via tube 6 to heater 3, and then pump 7 drives the heated water upward via tube 8 to aperture 9 for discharge onto the spreader plate 11.

As described earlier approximately ten grams of ground coffee are placed in the brewing basket for each six ounces of water dripped through. The brewed coffee drops into receptacle 2, and after brewing is complete, the heater or an auxiliary heater maintains the brew at the proper temperature.

Figure 2:
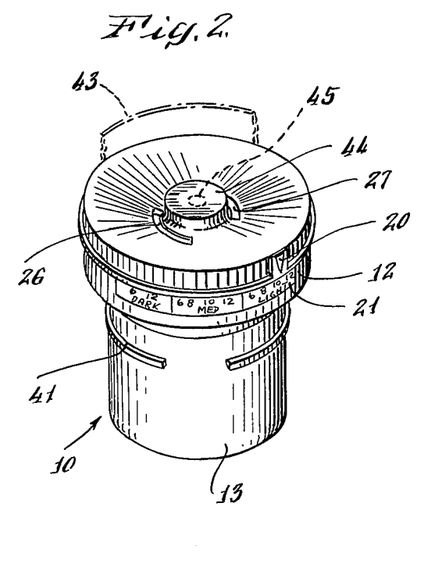
FIG. 2 is a perspective view of the new variable-brew, coffee brewing basket, comprising a spreader plate, a spreader basket, and a master brew basket.
Figure 3:
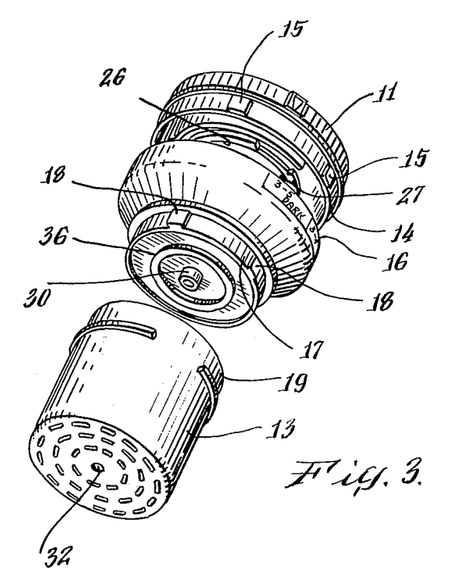
FIG. 3 is an exploded view in perspective of the brewing basket of FIG. 2.

The strength of the brew, for each of the different quantities brewed is selectively varied by manual adjustments of a valve structure in the variable brew-control basket 10 shown assembled in FIG. 2 and exploded in FIG. 3. This basket comprises a spreader or water-distribution plate 11 at the top, a water-spreader container or basket 12 below plate 11, and a master brew or brewing basket 13 at the bottom. FIGS. 2 and 3 illustrate how this assembly of brew basket parts fits together in a telescoping manner, but is easily separable for receiving coffee and for cleaning. Specifically, the spreader plate 11 has a flange 14 with friction pads 15 spaced around it; this flange fits into edge 16 of the spreader-container 12 with the friction pads 15 urged into tight friction engagement. Similarly the container 12 has a lower edge 17 with pressure pads 18 spaced around it; flange 17 is inserted into the open edge 19 of the master brew basket 13, with pressure pads 18 urged into tight frictional engagement therewith. In actual use, a paper filter is placed in the bottom of basket 13, the proper amount of coffee grounds is added on the top of the filter, and then the three components are assembled as shown in FIG. 2.

Figure 4:
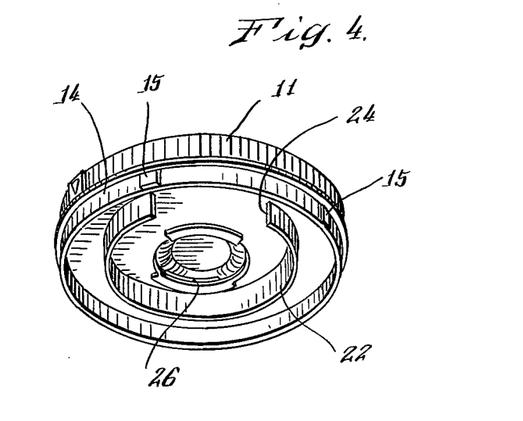
FIG. 4 is a bottom perspective view of the spreader plate of FIGS. 2 and 3.
Figure 5:
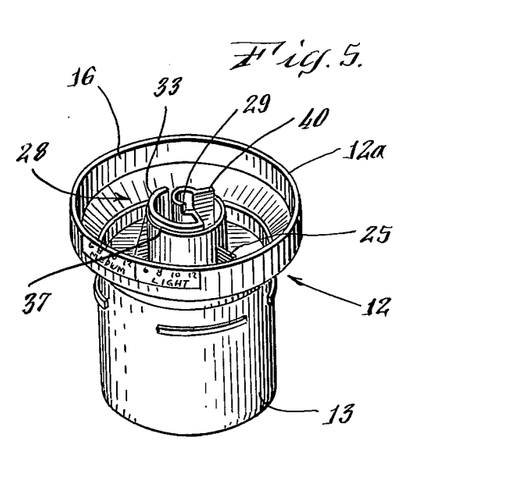
FIG. 5 is a top perspective view of the spreader basket assembled with the master brew basket.
Figure 6:
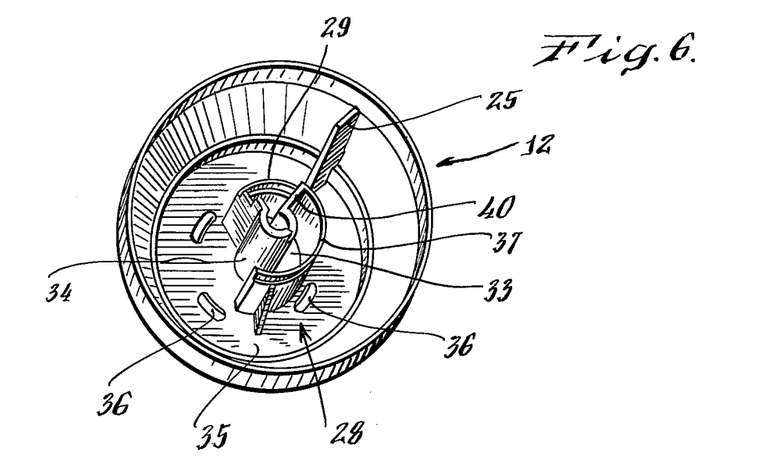
FIG. 6 is a top perspective view of the spreader basket.
Figure 7:
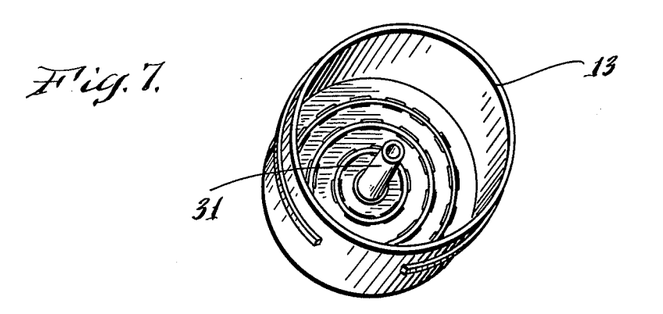
FIG. 7 is a top perspective view of the master brew basket.

To vary the strength of the coffee, the spreader plate 11 is rotatable relative to container 12 until the arrow 20 is aligned with the selected indicia marked on tape 21 on the outer surface of the container 12. The indicia reading from left to right, comprise three sections corresponding to "dark", "medium", and "light" strengths of the brew. With the "medium" and "light" sections are positions for 6, 8, 10 and 12 cups of water to be brewed; in the "dark" section there is a single position for all quantities of water. For example the spreader plate could be rotated until arrow 20 meets indicia "10" in the "medium" brew section. Hot water would then be distributed between the grounds and the overflow 30 to produce 10 cups of "medium" strength brew. As seen in FIG. 4, spreader plate 11 has a guide rib 22 which describes a portion of a circle terminating in ends 24; corresponding to this there is a stop member 25 extending upward from the spreader basket 12 as shown in FIGS. 5 and 6. When the spreader plate 11 is positioned on the container 12, the stop member 25 is situated in the space between the two ends 24 of the guide rib. Consequently the spreader plate 11 is rotatable clockwise until one end 24 contacts the stop 25 and prevents further rotation, or the spreader plate 11 is rotatable in the counter-clockwise direction until the other end 24 hits the same stop member 25. It is in this approximately 80° of rotation that the variation of brewed strength is achieved.

As shown in FIGS. 2, 3, 4 and 9, the spreader plate 11 has two arcuate slots 26 and 27 which extend through its surface. Hot water from the spout of the coffee maker is discharged above the spreader plate and flows through one or both of the slots, depending on which ones are open or partially open, as will be explained below. In FIGS. 5, 6, 8 and 10, there is visible in container 12 an upward extending column 28 which has a top opening 29a of an overflow chamber 29, and a bottom opening 30 as seen in FIG. 3. Thus, any water which enters the opening 29a of the container 12 passes directly through the container, out of aperture 30, and thence into tube 31 of the master brew basket and out through discharge opening 32 at the bottom of the master brew basket; water following this path by-passes any coffee grounds in the brew basket, and instead enters the receptacle to be mixed with the brewed coffee and in effect to dilute said coffee.

With regard to the chamber 33 adjacent the space 29 in the container 12 as shown in FIGS. 5, 6, 8 and 10 any water entering this space 33 will fall to the bottom thereof and then move laterally into water collection space 34 at the bottom surface 35 of the container, and finally discharged through the four drainage holes 36 spaced around the bottom of this container. It should be understood that the spreader plate and the spreader container function primarily to divide the hot water from the spout into two paths, with certain water going to the overflow and other water going to the coffee grounds; the water to the grounds is that which enters chamber 33, then flows to collection space 34, then through the four drainage holes 36, and finally into the master brewing basket 13 where the pre-determined amount of coffee has earlier been placed.

The manner by which the brew control mechanism determines the ratio of water to enter either the overflow passage 29 or the brewing passage 33 is as follows. In the spreader plate 11, the water slots 26 and 27 occupy about 70° and 90° respectively of a circle as seen most clearly in FIG. 9. The overflow space 29 represents approximately 65° of a circle, and the brewing-chamber water space 33 and 34 represents all the remaining area of a circle, namely about 295°. Along the top of the brewing water chamber 33 is edge 37 which represents about 165° of a circle, and engages the spreader plate in the vicinity of slots 26, 27 when the spreader plate is mounted on the top of the spreader basket. Rotation of the spreader plate causes the edge 37 to close portions of one or both of these slots, and block the water flow therethrough. As mentioned earlier the spreader plate can rotate through only about 80°, and we will designated the extreme counter-clockwise position is for light brew or weak strength, and the extreme clockwise position is for dark or strongest strength of brew. At the position for strongest strength, it is desirable to have the minimum amount of water in the overflow or preferably no water in the overflow, and all the water flowing through the coffee grounds. Consequently, in this position of extreme clockwise rotation, the edge 37 is in completely blocking relationship with slot 27 which is at that time away from overflow space 29, and consequently all the water flows through slot 26, and thence into the coffee brewing chamber 33, and into the coffee grounds in the master brewing basket 13. This situation is summarized in Chart I below, and illustrated schematically in FIG. 10A where four positions 26a-26d of slot 26 are shown on the left, and four corresponding positions 27a-27d, of slot 27 are shown on the right. When slot 26 is in position 26a, slot 27 is in position 27a; at position 26a the slot 26 is fully open to discharge water into water collection space 34 and thence to the coffee grounds. At the same time slot 27, at position 27a, is fully blocked by edge 37, so that there is no overflow. The result is coffee brewed to its darkest strength, as further explained in Chart I, line No. 1 for 6-12 cups, and line No. 2 for 3-5 cups.

In the extreme counter-clockwise position for weakest coffee, the edge 37 is in position 27d (FIG. 10A), to completely uncover slot 27, such that a maximum flow of water can occur through said slot and into the overflow space 29, and finally directly into the receptacle, thus by-passing the coffee grounds; simultaneously slot 26 is in position 26d, being about 20% open for water to go into the coffee grounds. This adjustment for the weakest or lightest coffee is further outlined in Chart I, line 9 for 12 cups, and line 10 for 4-5 cups. Numerous intermediate positions for slots 26 and 27 and resultant brew strengths are shown in FIG. 10A and corresponding Chart I.

Figure 11:
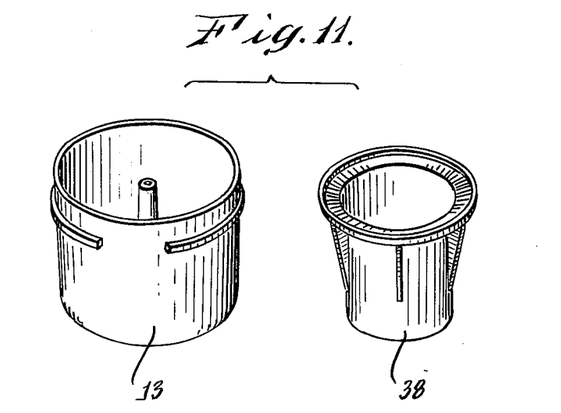
FIG. 11 is a perspective view of the master brew basket with a mini-brew basket.

Unfortunatey the relationship between the amount of coffee, the amount of water, the rate of water flow into the coffee, and the amount of brewing time is not exactly linear for determining the proportions of coffee and overflow water to provide the strength desired. It has further been determined that when seeking to brew 3 to 5 cups of coffee in a device designed for three to 12 cups of coffee, the coffee making apparatus as described up to this point is not completely satisfactory; coffee grounds placed in the master brew basket form a cylindrical mound through which the brew water flows, and spends a certain amount of time. If for example, three measures of coffee were placed in the master brew basket and three cups of water were flowed through, the three measures of coffee would produce a mound of coffee of such small height that the water would flow through very quickly and not spend enough time in the coffee grounds to brew the coffee, and additionally be not hot enough because there would be insufficient time for the apparatus as a whole to warm up. To remedy this problem, and to make it possible to brew as few as three cups of coffee in the apparatus designed for twelve cups, there is provided the mini-brew basket 38 shown in FIG. 11 adjacent to the regular master-brew basket 13. The diameter of the mini-brew basket is 2¼ inches as compared to the diameter of the master-brew basket of 3½ inches; the height of the mini-brew container is about 2½ inches compared to a height of approximately 3 inches in the master-brew container. In other regards the two baskets operate approximately the same with water from the spreader basket discharging from its four holes 36 into the top of the mini-brew basket which contains the coffee. A second indicia strip not shown is situated on the spreader basket, opposite strip 21 shown in FIG. 2; also there is a second arrow on the spreader plate opposite arrow 20 shown in FIG. 2. When desiring to brew 3-5 cups of coffee, the user should place, the paper filter into the bottom of master brew basket 13, then place the mini-brew basket 38

CHART I

Figure 10:
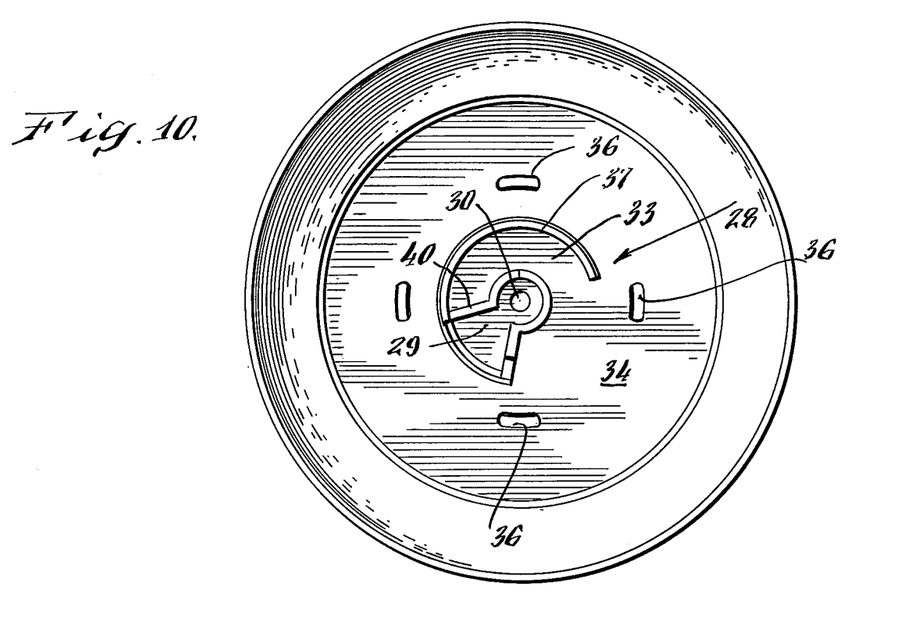
FIG. 10 is a top plan view of the spreader basket.
Figure 10A:
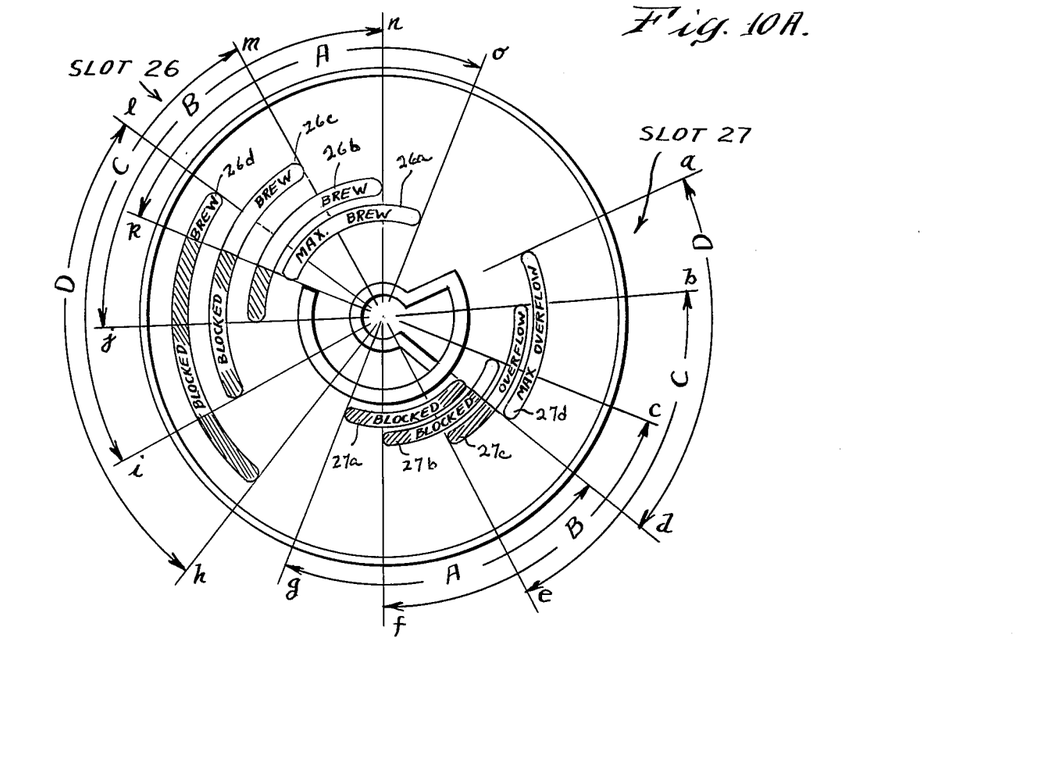
FIG. 10A is a schematic view showing the cooperation of the spreader plate slots with the spreader basket water chambers.

| Standard Brew Basket Of Mini-Brew Basket | Quantity Of Cups Brewed | Brew Strength | Slot 27, Water To Overflow | Position Of Slot 27 In FIG. 10 A | Slot 26, Water To Brew | Position Of Slot 26 In FIG. 10 A | Net Effect: Approx. Ratio Of Brew Water To Overflow Water |
|---|---|---|---|---|---|---|---|
| 1. Standard | 6-12 | DARK | Approx. 100% closed | 27a | Approx. 100% open | 26a | Brew water only; No overflow |
| 2. Mini | 3-5 | DARK | 100% closed | | 100% open | | Brew water only; No overflow |
| 3. Standard | 6 | MEDIUM | 35% open | 27b | 65% open | 26b | 2 to 1, Brew Water to overflow water |
| 4. Mini | 3 | MEDIUM | 35% open | | 65% open | | 2 to 1, Brew Water to overflow water |
| 5. Standard | 12 | MEDIUM | 55% open | | 55% open | | 1.1 to 1, Brew water to overflow water |
| 6. Mini | 4-5 | MEDIUM | 55% open | | 55% open | | 1.1 to 1, Brew water to overflow water |
| 7. Standard | 6 | LIGHT | 65% open | 27c | 40% open | 26c | 1.7 to 1, Overflow water to brew water |
| 8. Mini | 3 | LIGHT | 65% open | | 40% open | | 1.7 to 1, Overflow water to brew water |
| 9. Standard | 12 | LIGHT | 100% open | 27d | 20% open | 26d | 5 to 1, Overflow water to brew water |
| 10. Mini | 4-5 | LIGHT | 100% open | | 20% open | | 5 to 1, Overflow water to brew water | within the master brew basket 13, add 3-5 measures of ground coffee, then add spreader basket 12 and spreader plate 11. Finally plate 11 is rotated until the second arrow (opposite arrow 20) is aligned with the indicia corresponding to the desired strength of brew. This sub-assembly is then placed in the top of receptacle 2, and a corresponding amount of water is placed in reservoir 5, so that brewing can begin.

An additional feature of this new coffee maker, evident in FIGS. 5, 6, 8 and 10 is the provision for excessive amounts of water in the spreader basket 12 to flow from the water-collection space 34 and brew-water chamber 33 into the overflow chamber 29 and thence to the receptacle, by-passing the coffee grounds. An accumulation of excessive water may occur from various causes: one situation is where foaming occurs in the brew basket retarding water flow therethrough, and correspondingly retards flow from the spreader basket into the brew basket; nevertheless, hot water continues to enter the spreader basket from the spreader plate, so that water enters faster than it leaves. If this situation were not alleviated, flooding would result, either at the top surface of the spreader plate, or at the junction between this plate and the container 12. The structure to solve this problem is an overflow ledge 40 at the top of partition wall 39 between chambers 29 and 33, as shown in FIGS. 5, 6, 8 and 10. The elevation of ledge 40 is made slightly less than edge 12a of the container 12, to insure that overflow will begin before water in the collection space 34 rises to the level of edge 12a where leakage could occur. The top surface of the spreader plate has a depressed center area adjacent the flow slots 26, 27 to allow for a slight accumulation of water before flooding over the top would occur. A circular rib 41 locates the brew basket at the proper elevation within the neck of the receptacle 2.

Figure 8:
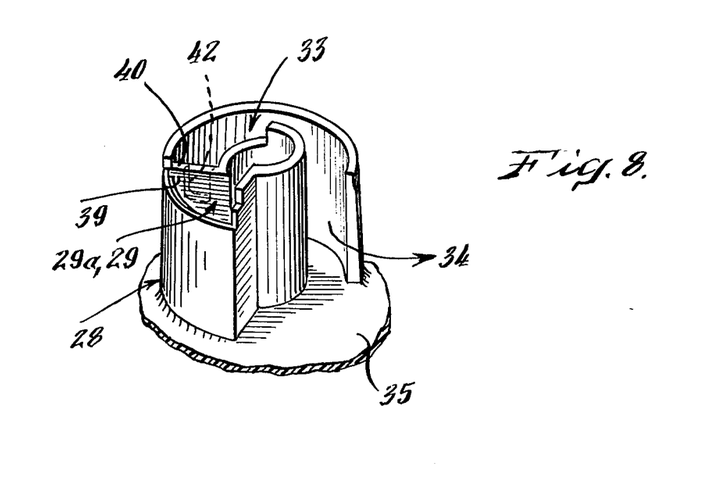
FIG. 8 is a fragmentary perspective view of the spreader basket, showing the auxiliary overflow passage.
Figure 9:
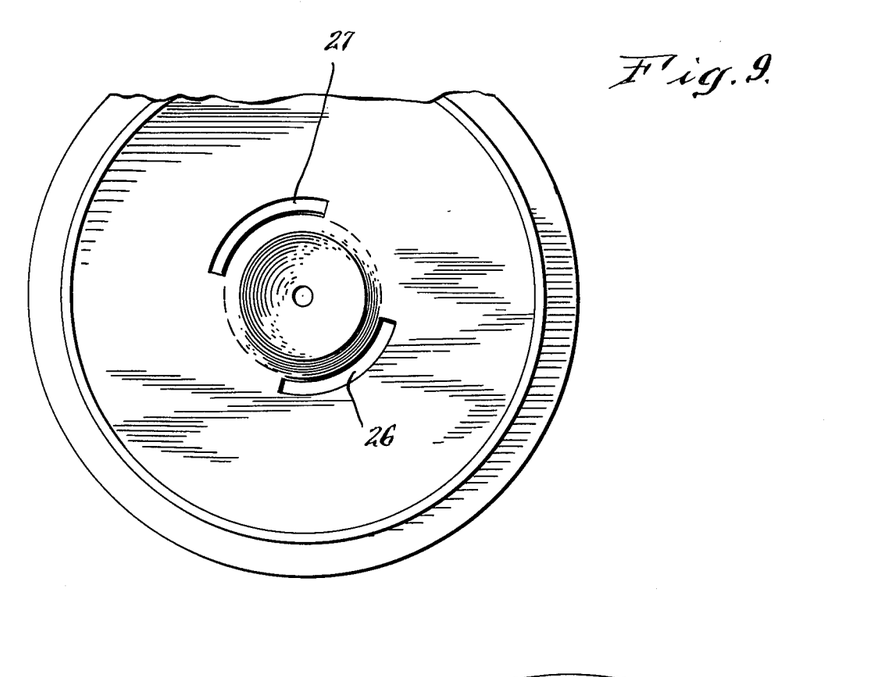
FIG. 9 is a fragmentary top plan view of the spreader plate.

An optional variation of this overflow ledge is shown in dotted lines in FIG. 8, where ledge 40 has a deep groove 42. Here overflow of water from chamber 33 into chamber 29 will occur earlier, namely when the chamber 33 water level has risen to the bottom of groove 42, i.e. considerably before the water level reaches the height of ledge 40. There are other components of this coffee making apparatus that are known in the prior art and are indicated in FIG. 1 as follows: The heater 3 comprises one or more electric heating elements supplied by household current for heating water from the reservoir and for heating the base support under the receptacle or coffee pot 2; in a preferred embodiment the pump 7 is combined with the heater 3 and a one-way valve 7a, with water downstream of the valve converted to steam which temporarily closes the valve and forces the heated water up tube 8 to discharge 9; the brewing basket parts 10, 12, and 13 are preferably injection molded plastic; and the receptacle 2 is a glass pitcher with a plastic handle. Obviously various different heaters and pumps might be used to provide heated drip water for the brew basket, and a heated platform for the receptacle.

In a still further variation of the spreader plate, an upstanding flange 43 (see FIG. 2) of height "X" is added around the top periphery defining therein a water-accumulation space, and a projection 44 of height "Y", about half of "X" is formed atop the center of this plate, with an aperture 45 through the projection for communication with the overflow chamber below. Thus, if excessive water accumulates atop the spreader plate, because discharge water is flowing onto the plate faster than said water is flowing through slots 26, 27, and such water rises to a level greater than "Y", flow will occur through said aperture 45 to said overflow chamber 29, and flooding will be avoided.

When this coffee maker apparatus is used to brew its maximum quantity of coffee at maximum strength, the spreader basket 12 should be sufficiently large to contain the water received from the spreader plate 11 with minimum overflow, because it is desired that all, or most of the water be directed to the brewing space; this design of spreader basket is also applicable for use with the mini-brew basket 38 when brewing 5 cups of coffee at maximum strength.

I claim:

1. A drip coffee maker operable with a supply of heated water, a quantity of ground coffee, and a brewed-coffee receptacle, which includes a variable-strength coffee-brewing assembly removably placeable atop said receptacle and comprising a brewing basket defining a brewing space for containing said ground coffee and an overflow duct by-passing said brewing space, a water-spreader container removably attached atop the brewing basket and defining a water-collection space and an overflow chamber, a water-distribution plate atop said water-spreader container, said water-distribution plate being provided with first and second apertures, and valve means for variably blocking water flow through each of said apertures, said valve means comprising a port of said water-spreader container positionable in adjacent and blocking relationship with said apertures, and said water-distribution plate being movable relative to said water-spreader container for effecting said variable blocking, said water-distribution plate, said water-spreader container and said brewing basket being longitudinally alignable, whereby heated water received by said water-distribution plate flows proportionately, as controlled by said valve means, (i) through said first aperture, said overflow chamber, and said overflow duct into said receptacle, and (ii) through said second aperture, said water-collection space, and said brewing space into said receptacle to provide brewed coffee of the desired strength.

2. A coffee maker according to claim 1, in which said water-distribution plate and said water-spreader container are relatively rotatable for variably blocking said apertures.

3. A coffee maker according to claim 2, in which said apertures comprise circumferentially spaced arcuate slots having the same and constant radius, and said blocking portion of the water-spreader container comprises cooperating arcuate edges each having a radius corresponding to that of said slots.

4. A coffee maker according to claim 1, in which said brewing basket and said water-spreader container are generally cylindrical and coaxial, and said overflow duct and said overflow chamber are generally coaxial.

5. A coffee maker according to claim 4, in which said water-spreader container is formed by walls of a height "a" defining said water-collection space, said overflow chamber being positioned within said water-collection space and comprising an upstanding column, formed by walls, at least one of said column walls separating said overflow chamber from said water-collection space and having a height "b", less than "a", whereby water in said water-collection space reaching a height greater than "b" flows over said wall of height "b" and into said overflow chamber and thence into said overflow duct.

6. A coffee maker according to claim 1, in which said water-distribution plate includes an upwardly extending flange of a height "x" defining a water-accumulation space, and an upwardly extending projection within said water-accumulation space of a height "y", less than "x", having a hole generally alignable with said overflow chamber, whereby water in said water-accumulation space reaching a height greater than "y" flows through said hole into said overflow chamber.

* * * * *

UNITED STATES PATENT OFFICE
CERTIFICATE OF CORRECTION

Patent No. 4,108,053　　　　　　　Dated August 22, 1978

Inventor(s) Richard C. Vink

It is certified that error appears in the above-identified patent and that said Letters Patent are hereby corrected as shown below:

Col. 8, line 28, Before "of" change "port" to

-- portion --

Col. 5, line 16, Before "designated" delete

"we will" and insert -- , as has been --

Signed and Sealed this

Twentieth Day of January 1981

[SEAL]

Attest:

RENE D. TEGTMEYER

*Attesting Officer*　　　　*Acting Commissioner of Patents and Trademarks*